(12) United States Patent
Boyer et al.

(10) Patent No.: US 7,578,178 B2
(45) Date of Patent: Aug. 25, 2009

(54) METHOD OF INSPECTING TURBINE INTERNAL COOLING FEATURES USING NON-CONTACT SCANNERS

(75) Inventors: Jesse R. Boyer, Berlin, CT (US); Benjamin W. Meissner, San Antonio, TX (US); Stephen D. Doll, Portland, CT (US); Randall W. Joyner, Union, CT (US)

(73) Assignee: United Technologies Corporation, Hartford, CT (US)

( * ) Notice: Subject to any disclaimer, the term of this patent is extended or adjusted under 35 U.S.C. 154(b) by 69 days.

(21) Appl. No.: 11/906,030

(22) Filed: Sep. 28, 2007

(65) Prior Publication Data

US 2009/0089020 A1   Apr. 2, 2009

(51) Int. Cl.
*G01M 15/14* (2006.01)

(52) U.S. Cl. .................................. 73/112.01; 73/116.03

(58) Field of Classification Search .............. 73/112.01, 73/116.03, 116.04
See application file for complete search history.

(56) References Cited

U.S. PATENT DOCUMENTS

| | | | |
|---|---|---|---|
| 3,749,501 A | 7/1973 | Wieg | |
| 3,840,993 A | 10/1974 | Shelton | |
| 3,995,157 A * | 11/1976 | Holub et al. | 250/302 |
| 4,155,173 A | 5/1979 | Sprandel | |
| 4,255,862 A | 3/1981 | Nakamura | |
| 4,467,214 A * | 8/1984 | Ito et al. | 250/559.47 |
| 4,483,079 A | 11/1984 | Band et al. | |
| 5,142,790 A | 9/1992 | Raho et al. | |
| 5,162,659 A | 11/1992 | Diamond et al. | |
| 5,448,505 A | 9/1995 | Novak | |
| 5,517,310 A * | 5/1996 | Paquette | 356/615 |
| 5,969,822 A | 10/1999 | Fright et al. | |
| 6,026,583 A | 2/2000 | Yoshizumi et al. | |
| 6,205,240 B1 | 3/2001 | Pietrzak et al. | |
| 6,271,924 B1 | 8/2001 | Ngoi et al. | |
| 6,344,656 B1 | 2/2002 | Hopkins et al. | |
| 6,538,725 B2 * | 3/2003 | Potyrailo et al. | 356/32 |
| 6,599,416 B2 * | 7/2003 | Kool et al. | 205/717 |
| 6,655,037 B2 | 12/2003 | Gotz et al. | |
| 7,146,291 B2 * | 12/2006 | Hough | 702/182 |
| 7,162,373 B1 * | 1/2007 | Kadioglu et al. | 702/35 |
| 7,169,242 B2 * | 1/2007 | Fernihough et al. | 148/512 |
| 7,278,460 B2 * | 10/2007 | Grunstra et al. | 164/28 |
| 2002/0089298 A1 * | 7/2002 | Hatley et al. | 318/568.12 |
| 2003/0050204 A1 * | 3/2003 | LaGraff et al. | 510/185 |
| 2005/0067065 A1 * | 3/2005 | Fernihough et al. | 148/512 |
| 2005/0072234 A1 * | 4/2005 | Zhu et al. | 73/579 |
| 2005/0171733 A1 * | 8/2005 | Hough | 702/182 |
| 2007/0091320 A1 * | 4/2007 | Hu et al. | 356/604 |
| 2007/0163745 A1 * | 7/2007 | Grunstra et al. | 164/369 |
| 2008/0247636 A1 * | 10/2008 | Davis et al. | 382/152 |

* cited by examiner

*Primary Examiner*—Lisa M Caputo
*Assistant Examiner*—Freddie Kirkland, III
(74) *Attorney, Agent, or Firm*—Kinney & Lange, P.A.

(57) ABSTRACT

A method of inspecting an internal feature of a gas turbine component includes removing a portion of the turbine component to expose the internal feature, treating the surfaces of the internal feature to provide the surfaces with a substantially uniform coloration, generating an electronic model of the internal feature, analyzing the electronic model generated with reference to a nominal electronic model, and providing an output based on the analysis of the electronic model generated.

20 Claims, 3 Drawing Sheets

METHOD OF INSPECTING TURBINE INTERNAL COOLING FEATURES USING NON-CONTACT SCANNERS

BACKGROUND

The present invention relates to methods and systems for inspecting turbine blade internal cooling features using non-contact scanners.

A gas turbine engine, such as a turbo fan engine for an aircraft, commonly includes a fan section, a compression section, a combustion section and a turbine section. The engine has a centrally located axis, which extends longitudinally through the sections. The primary flow path for working medium gases extends axially through the sections of the engine. A secondary flow path for working medium gases extends parallel to and radially outward of the primary flow path.

During engine operation, the fan draws the working medium gases, for example air, into the engine. The fan raises the pressure of the air drawn along the secondary flow path, producing useful thrust. The air drawn along the primary flow path into the compression section is compressed. The compressed air is channeled to the combustion section where fuel is added to the compressed air and the air/fuel mixture is burned. The products of combustion are discharged to the turbine section. The turbine section extracts work from these products to power the fan and compressor. Energy in excess of that required to power the fan and compressor contributes to useful thrust.

In order to withstand the extreme operating temperatures in gas turbine engines, some of the rotor blades and stator vanes (hereinafter referred to as "blades") in the compressor and turbine sections are internally cooled with bleed air drawn from, for example, the compressor. Internally cooled blades commonly include internal features, such as turbulators and trip strips, designed to increase cooling efficiency. Blade internal cooling features are generally in the form of protrusions of various sizes and shapes extending into the blade cavity from one internal wall or connected between both internal walls of the blade.

Various testing and quality assurance measures included in the manufacture and repair of internally cooled gas turbine blades necessitate measurement of the blade internal cooling features. Prior methods of and systems for inspecting the internal cooling features of blades commonly include predominately manual procedures, which are labor intensive and require complex set-up procedures poorly adapted for repeatability. For example, prior methods include scribing the geometry of one or more internal features by running a stylus over the feature and measuring the displacement of the stylus to extrapolate the feature geometry. Scribing the geometry of internal blade features has several disadvantages. Internal cooling features of gas turbine blades are often relatively small, for example, having a height in the range of approximately 0.01 to 0.02 inches (0.254 to 0.508 millimeters). Scribing the geometry of such small features may be prone to serious error, as it is possible for the stylus to jump over the features without accurately scribing their entire contour. Moreover, the accuracy of the inspection is dependent upon the size of the stylus tip, which may not be small enough to, for example, scribe a feature edge with a small radius. Another prior method includes projecting light onto the blade feature to create a shadow of the feature and manually tracing and measuring the feature shadow. In both of the aforementioned examples, the internal features of the blade must be exposed by removing one or more portions of the blade exterior, for example by wire cutting the blade in half. Additionally, the blade must be precisely oriented to accommodate the manual or machine assisted measurement of the internal feature geometry. Properly orienting the blade for inspection often requires special fixtures, which may depend on the particular blade and internal feature configuration inspected and the method of inspection employed.

SUMMARY

The present invention includes a method of inspecting an internal feature of a gas turbine component, which method includes removing a portion of the turbine component to expose the internal feature, treating the surfaces of the internal feature to provide the surfaces with a substantially uniform coloration, generating an electronic model of the internal feature, analyzing the electronic model generated with reference to a nominal electronic model, and providing an output based on the analysis of the electronic model generated.

DETAILED DESCRIPTION

Figure 1:
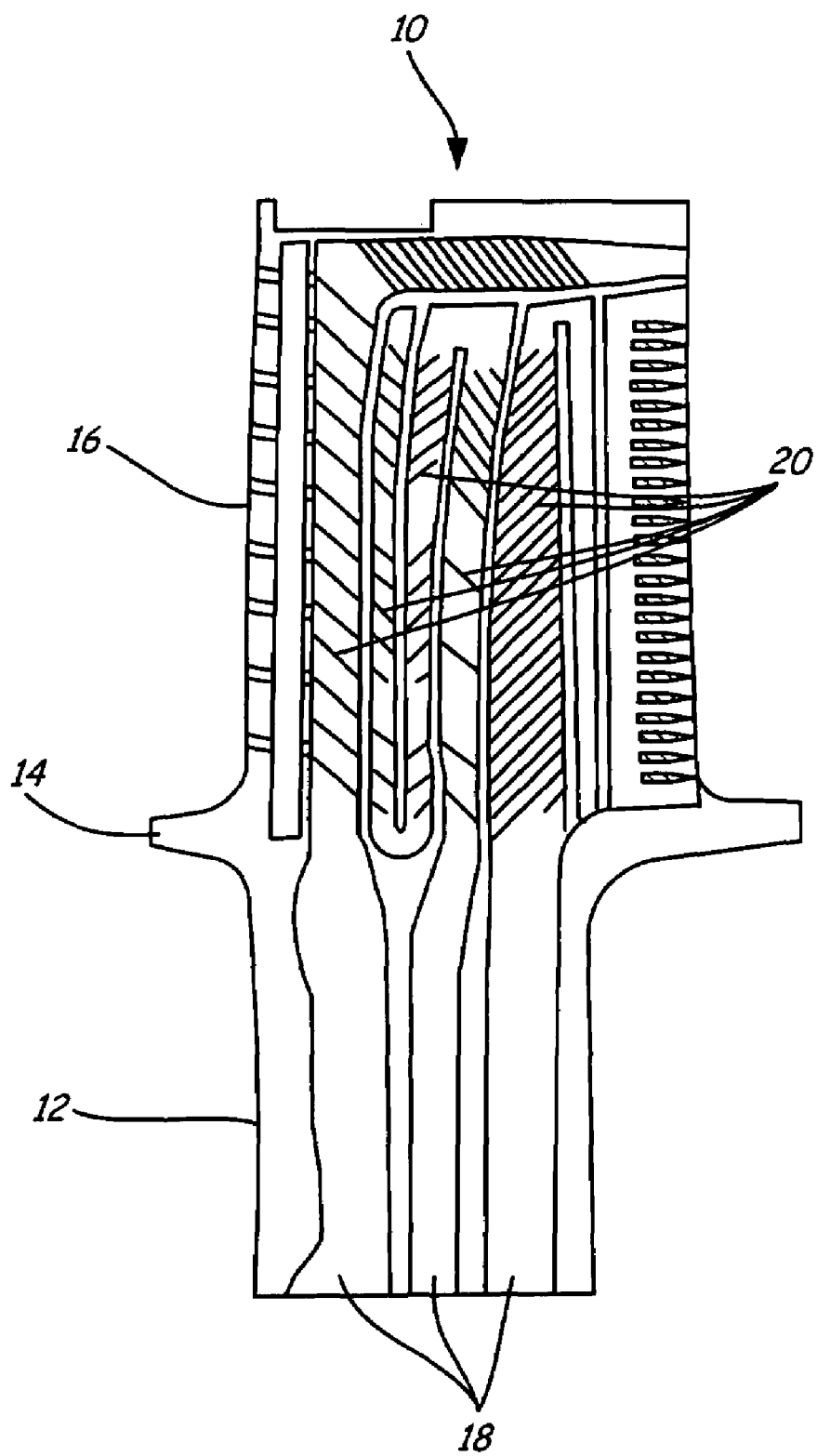
FIG. 1 is a section view of a gas turbine blade including internal cooling features.

FIG. 1 is a section view of a cooled gas turbine blade 10 including shank 12, platform 14, airfoil 16, passages 18, and trip strips 20. In FIG. 1, blade 10 is an internally cooled gas turbine blade including internal features which may be inspected using methods and systems according to the present invention. Blade 10 may be, for example, a high pressure turbine blade. Blade 10 includes shank 12, which may include a dovetail or fir tree root configured to be received in a slot in the rim of a rotor disc. Blade 10 also includes platform 14 integral with and radially outward of shank 12. Airfoil 16 of blade 10 extends radially from platform 14 and includes passages 18 and internal cooling features, such as trip strips 20. Trip strips 20 protrude from an internal wall of blade 10 into passages 18 and have an elongated rounded hump shape. During engine operation, blade 10 receives cooling air through shank 12. The cooling air flows through shank 12 and platform 14 into and through passages 18 of airfoil 16. The cooling air flowing through passages 18 encounters, for example, trip strips 20. Trip strips 20 may be designed to increase the surface area across which the cooling air flows, which in turn increases convective cooling of blade 10. The internal cooling features, such as trip strips 20, of blade 10 may be relatively small. For example, trip strips 20 may have a height in the range of approximately 0.01 to 0.02 inches (0.254 to 0.508 millimeters).

Figure 2:
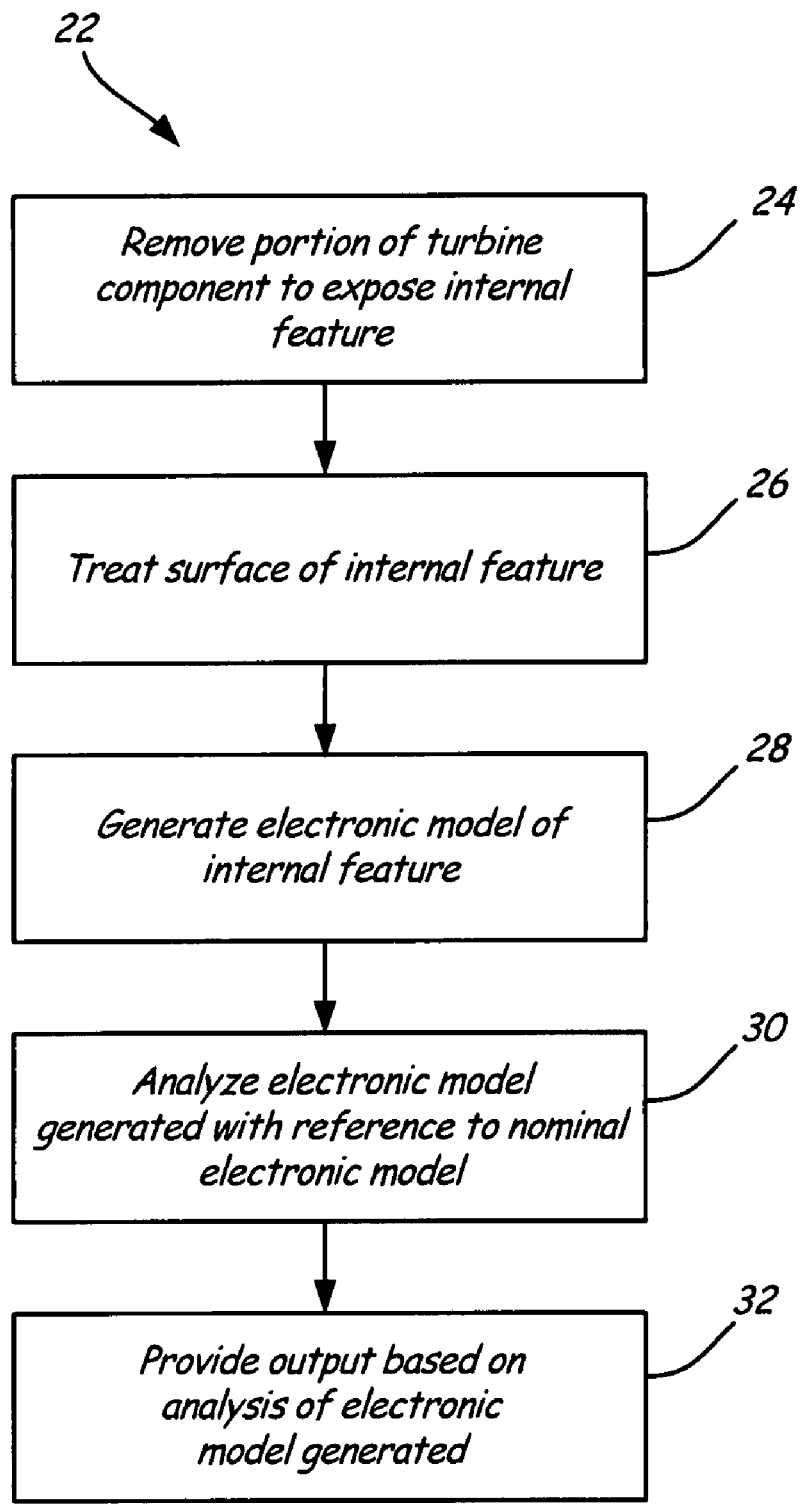
FIG. 2 is a flow chart illustrating a method according to the present invention of inspecting the internal cooling features of a gas turbine component.

FIG. 2 is a flow chart illustrating method 22 of inspecting an internal feature of a gas turbine component including removing a portion of the turbine component to expose the internal feature (24), treating the surfaces of the internal feature to provide the surfaces with a substantially uniform coloration (26), generating an electronic model of the internal feature (28), analyzing the electronic model generated with reference to a nominal electronic model (30), and providing an output based on the analysis of the electronic model generated (32). The internal feature of the component inspected in method 22 may be, for example, a trip strip 20 of blade 10 shown in FIG. 1. Methods and systems according to the present invention may also be adapted to inspecting the internal features of, for example, turbine stator vanes, or compressor blades or vanes.

Method 22 includes removing a portion of the turbine component to expose the internal feature. In practice, the turbine component, such as blade 10, may have a portion of the exterior walls of blade 10 removed to expose internal cooling features, such as trip strips 20. Removing a portion of blade 10 to expose trip strips 20 (24) may include, for example, securing blade 10 in a fixture and filleting blade 10 in half by wire cutting or other appropriate material removal methods such as machining, grinding, or electrical discharge machining (EDM).

Method 22 also includes treating the surfaces of the internal feature to provide the surfaces with a substantially uniform coloration (26). Treating the surfaces of the internal feature (26) may include grain etching the surfaces, coating the surfaces with a powder, or grit blasting the surfaces of the internal feature. For example, after portions of blade 10 have been removed to expose the trip strips 20 (24), blade 10 may be removed from the material removal fixture for grain etching the surfaces of trip strips 20. Grain etching is a surface treatment process by which the surface grain structure of a work piece is exposed to produce a uniform and high contrast surface finish. Grain etching the surfaces of trip strips 20 may include, for example, submerging blade 10 in a container of a caustic solution for a period of time, removing blade 10 from the caustic solution, and rinsing blade 10 with, for example, water to substantially remove the caustic solution. In another embodiment of the present invention, treating surfaces of the internal feature (26) may include coating the surfaces with a powder, such as hydrated magnesium silicate (more generally known as talcum powder). Coating the surfaces of the internal feature may be accomplished manually by an operator or with the assistance of one or more apparatuses configured to apply the powder substantially uniformly to the surfaces of the feature. In still another embodiment, treating the surfaces of the internal feature (26) may include grit blasting by which color variations on the surfaces of the internal feature are substantially removed and the surfaces are also given a low-gloss, matte finish.

In addition to treating the surfaces of the internal feature to provide the surfaces with a substantially uniform coloration (26), method 22 includes generating an electronic model of the internal feature (28). Generating an electronic model of the internal feature (28) may include generating a point cloud of the internal feature using a non-contact scanner, transforming the point cloud into a facet body of the internal feature, and orienting the electronic model generated with reference to a nominal electronic model of the turbine component. For example, blade 10 may be placed in a fixture adapted to position blade 10 for non-contact scanning. A non-contact scanner scans the surfaces of the internal features, e.g. trip strips 20 of blade 10, and generates a set of data points, i.e. a point cloud, corresponding to points on the surfaces of trip strips 20 of blade 10. The point cloud may then be transformed into a facet body, which approximates the surfaces of the trip strips 20 of blade 10. Facet bodies may be, for example, a polygon mesh, which mesh is a large number of flat polygons defined by and interconnected at data points in the point cloud and which taken together closely approximate a complex contoured surface. Polygon meshes may be stored in proprietary or non-proprietary file formats for repeated use or communication between one or more electronic systems, such as CAD, CAM, or CAE systems. An example non-proprietary file format is the "STL" format, which may be used after the facet body has been properly oriented in an electronic coordinate system, for example, by orienting the point cloud or facet body of the entire turbine component with reference to a nominal electronic model of the entire component. Non-contact scanners appropriate for use with embodiments of the present invention may be, for example, the ATOS optical measuring machine produced by Gesellschaft für Optische Messtechnik mbH ("GOM") based in Braunschweig, Germany. The ATOS system digitizes three dimensional workpieces by projecting a grid onto the part and using two cameras in two different positions and at two different angles with respect to the workpiece to triangulate the location of the intersection points on the grid. The point locations triangulated by the ATOS system may then be stored as a point cloud and may also be transformed into facet bodies, such as STL polygon meshes, by software components supplied by GOM or third party products such as Geomagic Studio manufactured by Geomagic, Inc. based in Research Triangle Park, N.C.

In addition to generating an electronic model of the internal feature (28), method 22 includes analyzing the electronic model generated with reference to a nominal electronic model of the internal feature (30). Analyzing the electronic model generated with reference to a nominal electronic model of the internal feature (30) may include analyzing the location and dimensions, such as heights, lengths, and radii, of the internal feature with reference to the location and dimensions in the nominal electronic model. For example, a turbine component inspection software program may be configured to analyze the electronic model generated with reference to the nominal model. The nominal model of the internal feature may include a datum, such as a center line or plane, which represents the nominal location of the feature on the turbine component. The inspection program may analyze the actual location of the internal feature by comparing the location of a reference datum in the generated electronic model with the location of a corresponding datum in the nominal model. Additionally, the program may analyze the actual dimensions of the internal feature with reference to nominal dimensions. The program may, for example, build a tolerance zone around the reference datum of the generated electronic model within which zone are acceptable dimension values for the actual internal feature geometry. The tolerance zone may be multi-dimensional such that each of the dimensions under investigation may have different tolerance limits. For example, the internal feature may be a trip strip 20 of blade 10 including three important dimensions: length, height, and radius (e.g. curvature of transition between airfoil interior wall and vertical walls of trip strip and curvature of top of trip strip). The height, length, and radius dimensions may each have different tolerance limits, such that the overall shape of the tolerance zone is not a constant offset from the nominal geometry of trip strip 20. After the tolerance zone is generated around the reference datum of the generated electronic model, the software program may interrogate the actual internal feature geometry, i.e. the generated electronic model in the form of the polygon mesh generated from a point cloud of non-contact scanned data, to determine if the dimensions are within the tolerance zone.

In addition to analyzing the electronic model generated with reference to a nominal electronic model of the internal feature (30), method 22 includes providing an output based on the analysis of the electronic model generated (32). Providing an output based on the analysis of the electronic model generated (32) may include generating electronic and hardcopy reports and storing analysis data in computer readable form for future use. For example, the inspection program may automatically or through user interaction generate one or more reports describing the analysis of the electronic model with reference to the nominal model. The reports may be generated in electronic form, for example in computer readable form, for review and future reference. Alternatively, the inspection program may automatically output the analysis data to a printing apparatus configured to print hardcopy reports. The inspection program may also be configured to store in computer readable form the analysis data along with the electronic model of the internal feature of the turbine component.

Figure 3:
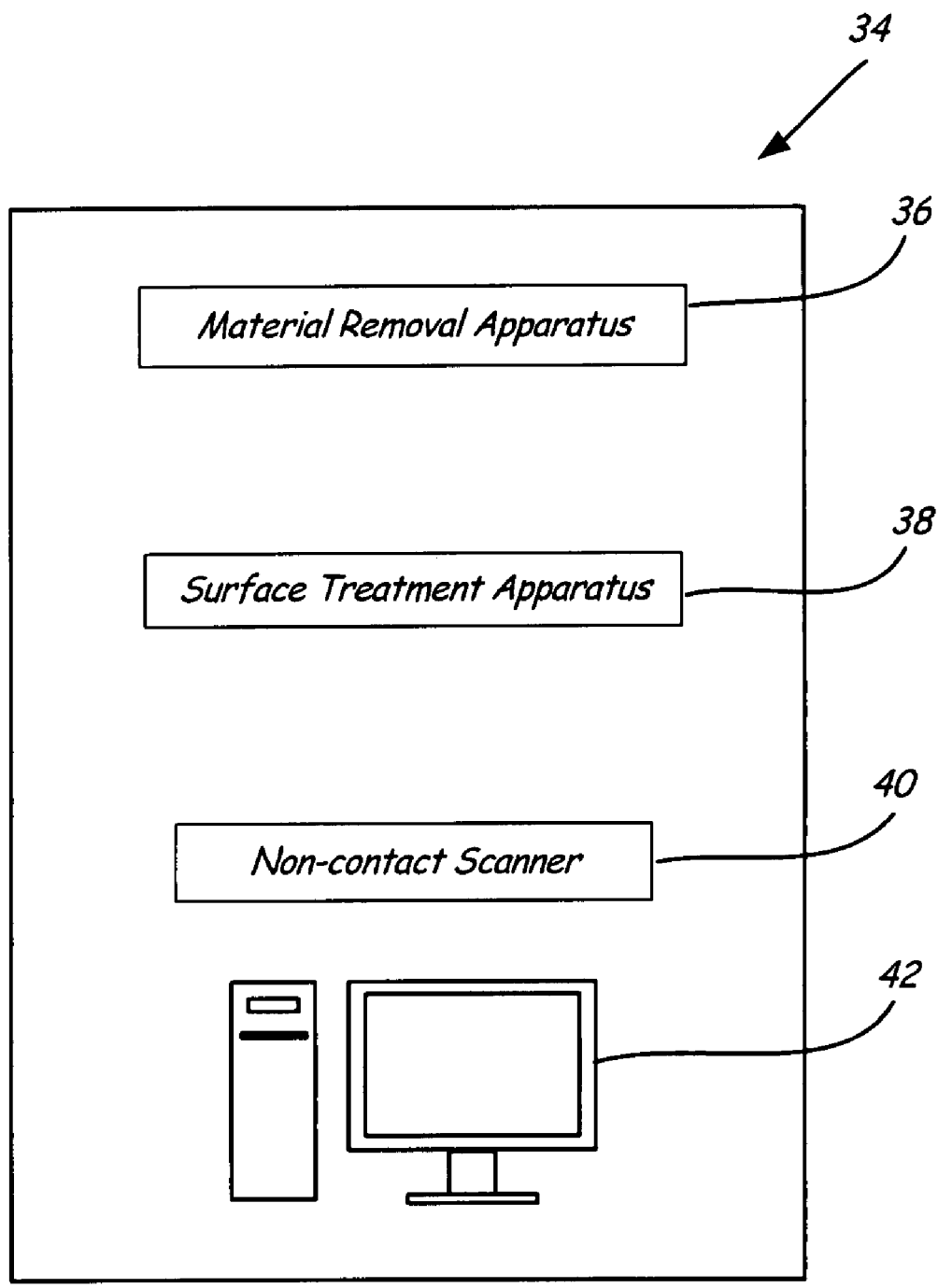
FIG. 3 is a schematic of one embodiment of a system for carrying out the method of FIG. 2.

FIG. 3 is a schematic of system 34 according to the present invention for inspecting one or more internal features of a gas turbine component, which system 34 includes material removal apparatus 36 configured to remove a portion of the turbine component to expose the internal feature, surface treatment apparatus 38 configured to treat the surfaces of the internal feature to provide the surfaces with a substantially uniform coloration, non-contact scanner 40 configured to generate an electronic model of the internal feature, and at least one computer 42 including one or more software components configured to analyze the electronic model generated with reference to a nominal electronic model and provide an output based on the analysis of the electronic model generated. As described with reference to method 22, material removal apparatus 36 may include wire cutting, conventional or electro-discharge machining, or grinding apparatuses configured to expose the turbine component internal feature. Surface treatment apparatus 38 may include manual or partially or fully automated devices for grain etching, coating, or grit blasting the surfaces of the internal features. Non-contact scanner 40 may be, for example, the ATOS optical measuring machine produced by GOM. The at least one computer 42 may be one or more computers including one or more software programs, such as the turbine component inspection software program described with reference to method 22. The turbine component inspection software program may include more than one software component and may be configured to run on a single computer or be distributed across multiple computers. The program may also be integrated into an existing software package interface. For example, the inspection program may be integrated into a common CAD software package such as Unigraphics, Solidworks, or Pro/Engineer. Alternatively, the inspection program may be a stand alone program configured to run on Windows, Macintosh, or LINUX based computer systems. The at least one computer 42 may also include storage components, such as disc drives or other memory devices, for storing in computer readable form outputs of analysis of the electronic models generated. Additionally the at least one computer 42 may be connected to output devices, such as printers or monitors, for providing electronic or paper reports of data from the analysis of the electronic models of the internal features.

Embodiments of the present invention have several advantages over prior methods of and systems for inspecting the internal features of gas turbine blades. Embodiments of the present invention may be easily adapted to a variety of blades and vanes without redesigning complex set-up procedures and fixtures. The non-contact scanning and computer aided analysis included in embodiments of the present invention substantially reduce overall inspection time. The electronic models and analysis results generated with embodiments of the present invention may be readily integrated with a variety of third party software packages for complimentary analysis or additional processing. Finally, inspection results may be stored and retrieved easily, as well as archived for future use.

Although the present invention has been described with reference to preferred embodiments, workers skilled in the art will recognize that changes may be made in form and detail without departing from the spirit and scope of the invention.

The invention claimed is:

1. A method of inspecting an internal feature of a gas turbine component, the method comprising:
    removing a portion of the turbine component to expose the internal feature;
    treating surfaces of the internal feature to provide the surfaces with a substantially uniform coloration;
    generating an electronic model of the internal feature using a non-contact scanner to optically scan the surfaces after treating;
    analyzing the electronic model generated with reference to a nominal electronic model; and
    providing an output based on the analysis of the electronic model generated.

2. The method of claim 1, wherein removing a portion of the turbine component comprises filleting the turbine component in half.

3. The method of claim 1, wherein generating an electronic model of the internal feature comprises:
    generating a point cloud of the internal feature using the non-contact scanner; and
    transforming the point cloud into a facet body of the internal feature.

4. The method of claim 3 further comprising:
    orienting the electronic model generated with reference to the nominal electronic model of the turbine component.

5. The method of claim 1, wherein analyzing the electronic model generated comprises analyzing a location of the internal feature in the electronic model with reference to a location of the internal feature in the nominal electronic model.

6. The method of claim 1, wherein analyzing the electronic model generated comprises analyzing one or more dimensions of the internal feature in the electronic model with reference to one or more dimensions of the internal feature in the nominal electronic model.

7. The method of claim 6, wherein the one or more dimensions of the internal feature analyzed are selected from a group of dimensions comprising lengths, heights, and radii of the internal feature.

8. A method of inspecting an internal feature of a gas turbine component, the method comprising:
    removing a portion of the turbine component to expose the internal feature;
    treating surfaces of the internal feature to provide the surfaces with a substantially uniform coloration, wherein treating the surfaces of the internal feature comprises grain etching the surfaces of the internal feature;
    generating an electronic model of the internal feature;
    analyzing the electronic model generated with reference to a nominal electronic model; and
    providing an output based on the analysis of the electronic model generated.

9. The method of claim 8, wherein grain etching the surfaces of the internal feature comprises:
    submerging the turbine component in a caustic solution for a first time period;
    removing the turbine component from the caustic solution; and
    rinsing the turbine component to substantially remove the caustic solution.

10. A method of inspecting an internal feature of a gas turbine component, the method comprising:
- removing a portion of the turbine component to expose the internal feature;
- treating surfaces of the internal feature to provide the surfaces with a substantially uniform coloration, wherein treating the surfaces of the internal feature comprises coating the surfaces of the internal feature with a powder;
- generating an electronic model of the internal feature;
- analyzing the electronic model generated with reference to a nominal electronic model; and
- providing an output based on the analysis of the electronic model generated.

11. The method of claim 10, wherein the powder comprises hydrated magnesium silicate.

12. A method of inspecting an internal feature of a gas turbine component, the method comprising:
- filleting the turbine component in half to expose the internal feature;
- grain etching surfaces of the internal feature;
- generating a point cloud of the turbine component including the internal feature using a non-contact scanner;
- transforming the point cloud into an electronic model of the turbine component including the internal feature;
- analyzing the electronic model with reference to a nominal electronic model of the turbine component including the internal feature; and
- providing an output based on the analysis of the electronic model of the turbine component including the internal feature.

13. The method of claim 12, wherein grain etching the surfaces of the internal feature comprises:
- submerging the turbine component in a caustic solution for a first time period;
- removing the turbine component from the caustic solution; and
- rinsing the turbine component to substantially remove the caustic solution.

14. The method of claim 12, wherein transforming the point cloud into an electronic model comprises:
- transforming the point cloud into a facet body of the turbine component including the internal feature; and
- orienting the facet body with reference to the nominal electronic model of the turbine component including the internal feature.

15. The method of claim 12, wherein analyzing the electronic model comprises analyzing a location of the internal feature in the electronic model with reference to a location of the internal feature in the nominal electronic model.

16. The method of claim 12, wherein analyzing the electronic model comprises analyzing one or more dimensions of the internal feature in the electronic model with reference to one or more dimensions of the internal feature in the nominal electronic model.

17. The method of claim 16, wherein the one or more dimensions of the internal feature analyzed are selected from a group of dimensions comprising heights, lengths, and radii of the internal feature.

18. A system for inspecting one or more internal features of a gas turbine component, the system comprising:
- a material removal apparatus configured to remove a portion of the turbine component to expose the internal features of the gas turbine component;
- a surface treatment apparatus configured to treat surfaces of the internal features to provide the surfaces with a substantially uniform coloration;
- a non-contact scanner configured to optically scan the surfaces after treatment and generate an electronic model of the turbine component including the internal features based upon the scan; and
- at least one computer including one or more software components configured to:
  - analyze the electronic model generated with reference to a nominal electronic model of the turbine component including the internal features; and
  - provide an output based on the analysis of the electronic model generated.

19. The system of claim 18, wherein analyzing the electronic model generated comprises analyzing a location of each of the internal features in the electronic model with reference to a corresponding location of each of the internal features in the nominal electronic model.

20. The system of claim 18, wherein analyzing the electronic model generated comprises analyzing one or more dimensions of each of the internal features in the electronic model with reference to one or more corresponding dimensions of each of the internal features in the nominal electronic model.

* * * * *